United States Patent
Moritz et al.

(10) Patent No.: US 9,829,713 B2
(45) Date of Patent: Nov. 28, 2017

(54) REFLECTIVE BEAM SHAPER

(71) Applicant: asphericon GmbH, Jena (DE)

(72) Inventors: Jens Moritz, Jena (DE); Sven Kiontke, Jena (DE); Ulrike Fuchs, Jena (DE)

(73) Assignee: asphericon GmbH, Jena (DE)

( * ) Notice: Subject to any disclaimer, the term of this patent is extended or adjusted under 35 U.S.C. 154(b) by 0 days.

(21) Appl. No.: 15/098,167

(22) Filed: Apr. 13, 2016

(65) Prior Publication Data
US 2016/0306179 A1 Oct. 20, 2016

(30) Foreign Application Priority Data
Apr. 14, 2015 (DE) .......................... 10 2015 105673

(51) Int. Cl.
*G02B 5/08* (2006.01)
*G02B 5/10* (2006.01)
(Continued)

(52) U.S. Cl.
CPC ....... *G02B 27/0983* (2013.01); *G02B 7/1822* (2013.01); *G02B 15/02* (2013.01); *G02B 17/0615* (2013.01); *G02B 17/0663* (2013.01); *G02B 17/0694* (2013.01); *G02B 19/0023* (2013.01); *G02B 27/0025* (2013.01); *G02B 27/30* (2013.01)

(58) Field of Classification Search
CPC ...... G02B 19/0023; G02B 7/182; G02B 5/10; G02B 17/0615; G02B 7/1822; G02B 27/0983; G02B 17/0694; G02B 27/30; G02B 5/09; G02B 5/122; G02B 5/124; G02B 5/136; G02B 17/002; G02B 17/004; G02B 26/0833; G02B 15/02; G02B 17/0633; G02B 27/0025
USPC ....... 359/858, 859, 850, 857, 861, 862, 863, 359/864, 865
See application file for complete search history.

(56) References Cited

U.S. PATENT DOCUMENTS 3,453,425 A 7/1969 Whitaker
4,205,902 A 6/1980 Shafer
(Continued)

FOREIGN PATENT DOCUMENTS

DE 10 2010 063 938 A1 6/2012
EP 0 649 042 A2 4/1995
(Continued)

*Primary Examiner* — Jade R Chwasz
(74) *Attorney, Agent, or Firm* — Christensen, Fonder, Dardi & Herbert PLLC

(57) ABSTRACT

A reflective beam former for changing a diameter of a collimated light beam. A first mirror surface of a first curvature type, a second mirror surface and a third mirror surface are in a beam path; the shapes of the surfaces cause a collimated light beam entering the beam former via a first or third mirror surface to leave via the third or first mirror surface, respectively. The beam former includes several third, curved mirror surfaces of a second, different curvature type, one type being convex, the other concave. The second mirror surface is a plane mirror surface with an axis perpendicular to the plane mirror surface, and is in the beam path between the first and one selected from the several third mirror surfaces such that the surfaces are confocal to each other. The beam former includes a selector for selecting one of the several third curved mirror surfaces.

19 Claims, 6 Drawing Sheets

(51) Int. Cl.
*G02B 27/09* (2006.01)
*G02B 15/02* (2006.01)
*G02B 17/06* (2006.01)
*G02B 27/30* (2006.01)
*G02B 7/182* (2006.01)
*G02B 19/00* (2006.01)
*G02B 27/00* (2006.01)

(56) References Cited

U.S. PATENT DOCUMENTS

| | | | |
|---|---|---|---|
| 4,475,793 A | | 10/1984 | Ford |
| 5,574,601 A | * | 11/1996 | Hall .................. G02B 27/0911 359/226.1 |
| 2012/0327662 A1 | | 12/2012 | Dang et al. |
| 2014/0293406 A1 | | 10/2014 | Wallmeroth et al. |

FOREIGN PATENT DOCUMENTS

| | | |
|---|---|---|
| EP | 0 802 436 A2 | 10/1997 |
| EP | 0 883 010 A2 | 12/1998 |
| EP | 0 921 427 A2 | 6/1999 |
| JP | 4-301613 A | 10/1992 |
| WO | WO 2014/036628 A1 | 3/2014 |

\* cited by examiner

REFLECTIVE BEAM SHAPER

PRIORITY CLAIM

The present application claims priority to German Patent Application No. 102015105673.9, filed on Apr. 14, 2015, which said application is incorporated by reference in its entirety herein.

FIELD OF THE INVENTION

The invention relates to a reflective beam former for changing the diameter of a collimated light beam. Such a beam former comprises, arranged one after the other in a beam path, at least one first mirror surface of a first type of curvature, at least one second mirror surface and at least one third mirror surface of a second type of curvature. The shapes of the mirror surfaces are matched to each other such that a collimated light beam entering the beam former via a first or third mirror surface leaves the beam former via a third or first mirror surface, respectively, as a collimated light beam.

BACKGROUND OF THE INVENTION

As a rule, laser beams which are used in many different technical and non-technical fields do not yet have the shape and the diameter necessary for a specific application on emerging from the source, and they therefore need to be adapted in terms of shape and size. This is carried out by means of beam formers. Different solutions on a refractive and a reflective basis are known for this in the state of the art. Compared with refractive beam formers, reflective systems have the advantage that they are already intrinsically achromatized and no adaptations are necessary with respect to the wavelengths for correcting aberrations. Moreover, beam formers for high-energy lasers can only be realized with mirrors since lenses can be destroyed in the case of power inputs of, for example, 40 kW and above. In the case of lower power ratings too, impurities or air bubbles in the glass, for example, can lead to laser light being absorbed locally which, in the worst case, can lead to the lens bursting. However, several mirrors are required in the case of reflective systems if the structure is to be carried out on-axis, and individual holders also need to be provided for the additional mirrors as a rule.

A reflective beam former is described, for example, in U.S. Pat. No. 4,205,902. The systems described there are based on the structure of a Schwarzschild telescope in which an incident beam is imaged in an image plane via a convex and a concave mirror which are arranged concentrically. Because of its design, the structure is corrected to the third order for spherical aberration, coma and astigmatism. The system described in U.S. Pat. No. 4,205,902 consists of the combination of two Schwarzschild telescopes, wherein the second is constructed backwards; here, an incident parallel beam first strikes a concave surface from which it is imaged onto a convex surface, with the result that a virtual image forms behind the convex mirror. All of the mirrors are formed spherical. For the beam enlargement, an incident beam is first directed from the convex mirror of a forwards-constructed Schwarzschild telescope onto a concave mirror of this telescope and imaged in a point. The convex mirror of a backwards-constructed Schwarzschild telescope is arranged in the beam path between the concave mirror and the image point, which convex mirror guides the beam onto a concave mirror which, in turn, produces a parallel output beam with a diameter which is enlarged compared with the input beam. The mirrors therefore all have an off-axis structure, the incident beam and the emerging beam run parallel and offset with respect to each other, wherein the vectorial direction of both beams is the same. In total, therefore, four mirrors are used in this system, each two of which are arranged concentrically, i.e., they have a common centre of curvature, but the arrangement is effected in each case off-axis.

A simple system for beam expansion or beam compression is described in Japanese unexamined patent application JP 04301613 A. The system consists of two parabolically shaped mirrors, one convex and one concave. In order to expand a beam, for example, an incident beam of small diameter is guided onto the convex surface of one of the mirrors and directed by this in the means at a right angle onto the surface of the concave parabolic mirror. There, in turn, the light leaves the mirror as an expanded beam with a diameter enlarged compared with the incident beam and runs further in the same direction as the incident beam but offset with respect to this.

In EP 0 649 042 B1 a system is described in which the beam diameter is changed and the beam runs further on-axis, wherein, in addition, the ratio of the diameter of the incident to the emerging beam can be varied. For the beam enlargement, a beam striking a parabolic convex mirror is deflected and directed onto a concave, parabolic mirror, as was already stated in connection with JP 04301613 A. The surfaces of both mirrors are arranged confocally, i.e., the focal point of the concave mirror coincides with the focal point of the convex mirror. Both parabolic surfaces are formed on a monolithic metal block. As the mirror surfaces are parabolic surfaces, the ratio of the diameter of incident to emerging beam can be changed in that the area in which the incident beam strikes the parabolic surface is varied. In this way, different curvatures can be tapped. For this, a system of two flat mirrors is used, a first flat mirror directs the incident beam onto the convex surface, from there the light is directed to the concave mirror and then onto a second plane mirror which guides the emerging bundle of parallel beams further on-axis with a diameter which is enlarged compared with the input beam bundle. By displacing the two plane mirrors towards each other, different areas of the parabolic mirror surfaces can be reached, with the result that different enlargements can be set. A disadvantage is that the paths of the two plane mirrors need to be matched to each other, which involves an expensive control system.

SUMMARY OF THE INVENTION

The object of the invention is therefore to develop as robust a system as possible which can be operated with little outlay and has as few mirrors as possible, with which system, however, several diameter ratios can be set and which can optionally also be coupled into the beam path of existing systems in a modular way without large technical outlay.

This object is achieved in the case of a reflective beam former of the type described at the beginning in that the at least one second mirror surface is designed as a plane mirror surface with a plane mirror axis perpendicular to the mirror plane and the beam former comprises several third, curved mirror surfaces of a second type of curvature which differ in terms of their curvatures. One of the two types of curvature is convex and the other is concave. In addition, the beam former comprises selection means for the selection of one of the several third curved mirror surfaces by selecting a position for a plane mirror surface in the beam path along the plane mirror axis for variable setting of the ratio of the diameter of entering to emerging light beam. In addition, the second mirror surface is arranged in the beam path between the first and one selected from the several third mirror surfaces in such a way that the first and the selected third mirror surface are positioned confocal with respect to each other mediated via the second mirror surface.

In contrast to the state of the art, in particular EP 0 649 042 B1, here a plane mirror surface is arranged between the selected one of the several third mirror surfaces and the first mirror surface. This second mirror surface, the plane mirror surface, is coupled to the selection means or to part of the selection means. Thus, for the variation of a particular change in the beam diameter, only the position of a single mirror surface needs to be adapted.

The selection means for the selection of one of the several third curved mirror surfaces can be designed in different ways. On the one hand, it is possible to provide precisely one plane mirror surface, i.e., a second mirror surface and to mount this on a plane mirror carrier which therefore carries the plane mirror surface. The plane mirror carrier can then be displaced along the plane mirror axis and/or tilted against this, with the result that it is possible to switch between the several third mirror surfaces, i.e., in each case a different third mirror surface is chosen by displacement and/or tilting.

In an alternative embodiment, the selection means comprise several plane mirror carriers which can be introduced alternatively into the beam path along the plane mirror axis at predetermined positions and which in each case carry one plane mirror surface. Therefore, depending on the selection, one of the plane mirror carriers is coupled into the beam path. This has the advantage compared with the first-named alternative that no displacement is necessary, whereby the accuracy of the positioning of the plane mirror surfaces is increased and also the changeover speed can be increased.

In a third alternative the invention provides several similar plane mirror holders which can be coupled into the beam path alternatively via coupling means, wherein a plane mirror holder holds at least one plane mirror with a plane mirror surface and with each plane mirror a different third mirror surface can be selected. This is a very robust variant which is to be preferred, for example, when the enlargement does not need to be changed too often. If the incident and emerging beams run parallel but in opposite directions, such a mirror holder can, for example, have a symmetrical structure, i.e., be designed with two plane mirrors and duplicate coupling means, with the result that, depending on the coupling, two different diameter ratios can be set with one plane mirror holder. The advantage of the variant with the plane mirror holder is that no displacement needs to take place along the beam axis, for the selection of a different enlargement, a different mirror holder is simply used, wherein the coupling takes place without adjustment.

For the adjustment-free coupling, the coupling means preferably comprise a first coupling element which is formed on the plane mirror holder or is arranged there and a second coupling element which is formed on the base support or is arranged there. The first coupling element can be connected to the second coupling element in a non-positive-locking and/or a positive-locking manner, for example by means of a plug-in connection or a screw connection.

By using a plane mirror surface connected between the curved mirror surfaces the position of which can be changed, either by displacement along the plane mirror axis or by alternatively introducing different plane mirror surfaces at different positions, to select or set the ratio of the diameter of the entering collimated light beam to that of the emerging collimated light beam, with the result that the confocal alignment of the two curved mirror surfaces with respect to each other is maintained, the setting of the enlargement can be reduced to the use of a plane mirror or a plane mirror surface, wherein the incident and the exiting beam bundle also run parallel to each other but in opposite directions. In contrast, two elements are used in the state of the art. In this way, interference is reduced, in addition the paths and positions of several mirrors do not need to be matched to each other.

In a particularly preferred embodiment of the invention, the third mirror surfaces are arranged fixed on a common base support at distances from the plane mirror axis which differ from each other. In addition or alternatively, the first mirror surface is also arranged fixed on the base support. This can be designed as a monolithic block, correspondingly ground and polished and covered with mirror surfaces.

The at least one first mirror surface and the several third mirror surfaces are predominantly convex or predominantly concave, wherein the expression "predominantly" means that the prevailing curvature is convex or concave but different curvatures can also be realized locally to correct imaging errors, for example by means of aspherical elements or free-form corrections.

If both the at least one first and the several third mirror surfaces are arranged on a monolithic base support, this decreases the interference further since the first and the third mirror surfaces are always positioned fixed with respect to each other, with the result that no accidental adjustment and thus deterioration in the beam formation can take place here. The second coupling element for an optional plane mirror holder is then formed on the base support.

In a particularly robust modification of the invention which is simple to operate, the base support is formed as a monolithic element which is made of a material with a higher refractive index than air and is transparent to the light of the light beam. It comprises at least one plane mirror surface which is formed on the base support at a predetermined distance from the latter. To set different enlargements, the element preferably comprises, however, several plane mirror surfaces formed on the monolithic element parallel to each other at different, predetermined distances from the base plane of the monolithic element, each of which plane mirror surfaces is assigned to a different third mirror surface. The base body can, for example, be formed cuboid.

On one side of the cuboid made, for example, of a glass which fulfils the named conditions, the first curved mirror surface and the several curved mirror surfaces are formed. The light beam enters the base support via a boundary surface which is perpendicular to the beam direction, is reflected on the first mirror surface, wherein total reflection is preferably utilized in the case of all reflections inside, or reflective coating is applied to the corresponding side of the cuboid. The light beam is directed onto the flat plane mirror surface, likewise reflected there again and directed onto a third mirror surface, wherein the selection of the third mirror surface depends on the position of the plane mirror surface in relation to the third mirror surface. From there, the beam is reflected once more and emerges again perpendicularly through a boundary surface. In this way, on-axis beam enlargements or reductions can be achieved with a single element.

In a particularly preferred embodiment, the first curved mirror surface and the several third curved mirror surfaces are sectional surfaces made from paraboloids or from cylindrical mirrors with a parabolic cross section. However, they can also be formed as free-form surfaces. If they are formed as sectional surfaces of cylindrical mirrors, the beam expansion does not take place rotation-symmetrically, i.e., circularly, but only elliptically. In such a case, several reflective beam formers can preferably be arranged sequentially one behind the other, wherein a second beam former is arranged rotated by a predetermined angle, preferably 90°, with respect to the first beam former, with the result that a collimated light beam is expanded or compressed completely rotation-symmetrically.

The optical axis of the incident light beam, the optical axis of the emerging light beam and the plane mirror axis are preferably arranged parallel to each other for a compact design, wherein the optical axis of the incident and of the emerging light beam can also lie on a common straight line.

It is understood that the features named above and those yet to be explained below can be used not only in the stated combinations but also in other combinations or alone, without departing from the framework of the present invention.

BRIEF DESCRIPTION OF THE DRAWINGS

The invention is explained in even more detail below by way of example with reference to the attached drawings, which also disclose features essential to the invention. There are shown in.

DETAILED DESCRIPTION

Figure 1:
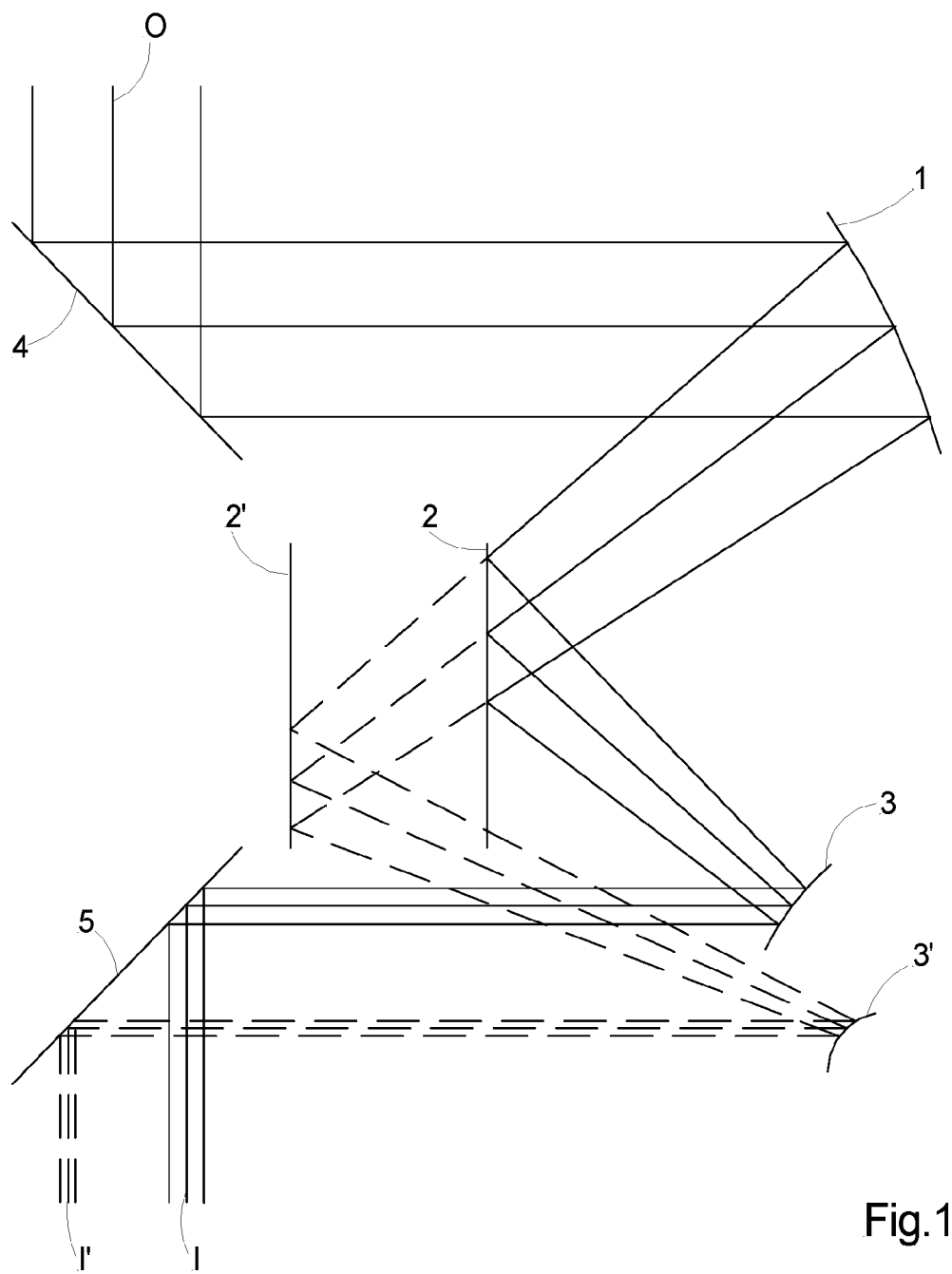
FIG. 1 depicting the basic structure of a reflective beam former.

In FIG. 1, the basic structure of a first embodiment of a reflective beam former is shown with which the diameter of a collimated light beam, more precisely of a collimated bundle of parallel beams, can be changed. The beam former comprises, arranged one after the other in a beam path, at least one first mirror surface 1 of a first type of curvature, at least one second mirror surface 2, 2' and at least one third mirror surface 3, 3', wherein the mirror surfaces 1, 2 and 3 or 1, 2' and 3' are matched to each other, with the result that a collimated light beam entering the beam former via a first mirror surface 1 or a third mirror surface 3, 3' leaves the beam former again via a third mirror surface 3, 3' or a first mirror surface 1, respectively, as collimated light beam.

The beam former comprises several third mirror surfaces 3, 3' of a second type of curvature. The several third mirror surfaces 3, 3' differ in terms of their curvatures. One of the two types of curvature is predominantly convex and the other of the two types of curvature is predominantly concave. By way of example, in the present case, the first mirror surface 1 is predominantly concavely curved and the several third mirror surfaces 3, 3' are predominantly convexly curved. The number of the mirror surfaces of each of the types of curvature is not fixed. For example, several predominantly concave mirror surfaces and one or more predominantly convex mirror surfaces can also be realized in the beam former. The beam can either enter the beam former via one of the predominantly convex mirror surfaces, with the result that it is enlarged or, for beam reduction, via one of the predominantly concave mirror surfaces. The expression "predominantly" indicates the prevailing type of curvature; however, corrections, for example aspherical corrections which comprise the other type of curvature, can also be attached, in particular to the mirror lateral surfaces, but only locally. The mirror surfaces can be sectional surfaces made of paraboloids or cylindrical mirrors with a parabolic cross section but they can also be formed spherical or as free-form surfaces. In the example shown in FIG. 1—without limiting the generality—the first type of curvature is chosen to be concave and the second type of curvature is chosen to be convex. It would equally be possible to choose the first type of curvature of the first mirror 1 to be convex and the second type of curvature with the third mirror surfaces 3, 3' to be concave. For the purposes of clarity, however, only this variant is shown here. In the present example, precisely one first mirror surface 1 and two third mirror surfaces 3, 3' are represented. This, too, is only for reasons of clarity; several first mirror surfaces 1 can also be present and only one third mirror surface 3, but it is also possible to provide both several first mirror surfaces 1 and several third mirror surfaces 3.

The at least one second mirror surface 2 is designed as a plane mirror surface; it comprises a plane mirror axis perpendicular to the plane mirror surface, i.e., the mirror plane. The second mirror surface 2 is arranged in the beam path between the first and one selected from the several third mirror surfaces 3, 3' in such a way that the first mirror surface 1 and the selected third mirror surface are positioned confocal with respect to each other. In the present case, a confocal orientation of the first mirror surface 1 and the third mirror surface 3 also selected here is thus only produced by the mediation of the second mirror surface 2. The same applies analogously to the embodiment represented by a broken line with a further second mirror surface 2' and a further third mirror surface 3'. In this way, greater flexibility accompanied by simpler manufacture can be achieved compared with the state of the art, where the two curved mirror surfaces need to be positioned confocal with respect to each other directly and without an interposed mirror.

In addition, the beam former comprises selection means for the selection of one of the several third curved mirror surfaces 3, 3' by selecting a position for a plane mirror surface 2, 2' in the beam path along the plane mirror axis for variable setting of the ratio of the diameter of entering collimated light beam to emerging collimated light beam. If, for example, the position in which the second plane mirror surface 2 is drawn in FIG. 1 is selected, the third mirror surface 3 is selected. If the second mirror surface is located at the position at which the second mirror surface 2' is drawn, a further third mirror surface 3'—represented by the broken lines—is selected. This selection can take place in different ways, as explained further below.

Depending on the direction from which the beam bundle enters the beam former, the beam diameter is either enlarged or reduced. If a beam bundle or the light beam first strikes the concave curved first mirror surface 1, depending on the selected third mirror surface, it leaves the beam former either via the third mirror surface 3 or the further third mirror surface 3'. In order to strike the mirror surface 3', after the reflection on the first mirror surface 1, the light beam must cover a longer path than to the third mirror surface 3, with the result that the diameter of the light beam emerging via the third mirror surface 3 is larger than the diameter of the light beam emerging via the further third mirror surface 3'.

In the case of reverse beam guidance, different diameters of input beams can be enlarged to a uniform, larger diameter of the output beam. The embodiment shown in FIG. 1 represents only one example; several third mirror surfaces 3 can also be present or several mirror surfaces 1, with the result, for example, that a diameter of an input beam can be enlarged to different diameters of an output beam.

Because different plane mirror surfaces 2, 2' are used for the selection of one of the third mirror surfaces 3, 3', the expense on adjustment can be reduced compared with an embodiment with curved mirrors which border each other directly as the adjustment only needs to take place in three degrees of freedom. Compared with the use of spherical components, aspherical components make it possible to improve beam quality, reduce installation space and work with larger beam diameters.

The beam path can be guided on-axis by means of additional tilted mirrors 4 and 5 which makes the modular use of the system easier with regard to the configuration of an interface. However, the beams—for example emerging via the third mirror surfaces 3, 3'—do not run centrally in relation to the optical axis but offset with respect to it. This beam offset needs to be taken into consideration in the design of corresponding devices which use this system.

In a preferred embodiment, the third mirror surfaces 3, 3' are arranged fixed on a common base support at distances from the plane mirror axis which differ from each other but are well-defined. This makes the adjustment easier as it is then ensured that a movement of the several third curved mirror surfaces relative to each other is ruled out, which makes possible a more accurate adjustment of the possible positions for the plane mirror surfaces 2, 2'. The positioning becomes even more accurate when the first mirror surface is also arranged fixed on the base support. This also allows the first mirror surface 1 and the several third mirror surfaces 3, 3' to be produced in one work step. In particular when several first mirror surfaces are used, it is also possible to arrange exclusively the first mirror surfaces on the common base support, preferably, however, together with the third mirror surfaces 3, 3'.

The selection means can be realized in different ways.

A first possibility is to provide a plane mirror carrier which can be displaced along the plane mirror axis and/or can be tilted for the selection of one of the several third mirror surfaces 3, 3', and which carries the plane mirror surface 2. In this case, therefore, only a single plane mirror surface 2 is used which, however, can be moved into different positions along the plane mirror axis by means of the displaceable plane mirror carrier. In this case, the numbers 2 and 2' in FIG. 1 identify different positions of one and the same plane mirror surface. The displacement can take place, for example, by motor via a positioning cam, with the result that the positions assigned to the third mirror surfaces 3, 3' can be reached in a targeted manner.

A further possibility is to use several plane mirror carriers which can be introduced into the beam path along the plane mirror axis at predetermined positions preferably alternatively and which in each case carry one plane mirror surface. In this case, the second mirror surfaces 2 and 2' in FIG. 1 are physically different mirror surfaces each of which sits on its own plane mirror carrier and can be pivoted, slid or otherwise introduced into the beam path. Here too, the change can be motor-driven, and although this variant requires more space and more material, it permits shorter switchover times between individual beam diameter ratios.

A third alternative comprises several similar plane mirror holders which can be coupled into the beam path alternatively via coupling means, wherein a plane mirror holder holds at least one plane mirror with a plane mirror surface and with each plane mirror a different third mirror surface can be selected without adjustment.

Figure 2A:
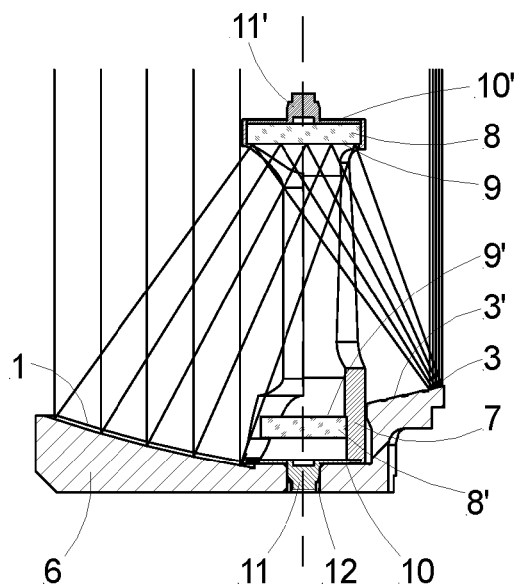
FIG. 2 *a-c*) depicting a first embodiment of such a beam former.
Figure 2B:
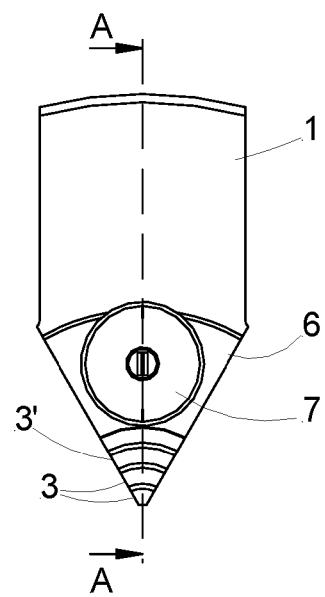
Figure 2C:
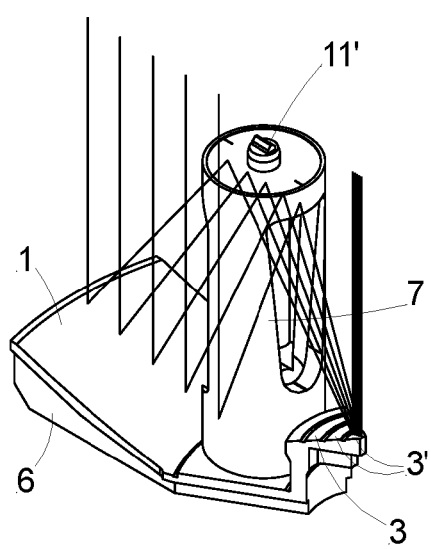

This last-named variant is explained in more detail below with reference to FIGS. 2*a*-*c*. In FIG. 2*a*, a reflective beam former is represented in a cross section along an axis AA which can be seen in the top view shown in FIG. 2*b*. FIG. 2*c* shows the reflective beam former in a perspective view. Here, both the several third mirror surfaces 3, 3' and the first mirror surface are arranged fixed on a common base support 6. As base support, materials are preferably used which have as low as possible a coefficient of thermal expansion in the temperature range relevant for the use in order to keep distortions of the beam path and imaging errors as low as possible. As is to be seen in the top view in FIG. 2*b*, the shape of the base support 6 corresponds substantially to a section from a segment of a circle which was additionally cut to the outer circumference. In manufacturing terms it is therefore possible to produce several such base supports 6 from one circular mono block. The first mirror surface 1 and the several third mirror surfaces 3, 3' can then be produced in one work step for the whole mono block, i.e., ground, polished and covered with a reflective layer, since the rotational symmetry of the mono block can be utilized. In manufacturing terms it is therefore advantageous not to produce the mirror surfaces as a paraboloid but only with a parabolic cross section along the axis AA, the result of which is then that, if it is desired to expand or compress a beam in two directions perpendicular to each other, two beam formers need to be arranged in series behind each other, wherein the two beam formers are tilted by an angle of 90° with respect to each other in order to expand or compress the beam in two directions orthogonal to each other. Of course, it is also possible to design the first mirror surface 1 and the third mirror surfaces 3, 3' differently, for example completely parabolic, with the result that the light beam is compressed or expanded completely rotationally symmetrically—with a circular cross section before and afterwards.

A plane mirror holder 7 is connected to the base support 6. Two plane mirrors 8, 8' with plane mirror surfaces 9, 9' are arranged in the plane mirror holder 7; they are held by the plane mirror holder 7. In the representation shown in FIG. 2*a*, the plane mirror 8 with the plane mirror surface 9 is active in the beam path; this directs light from the first mirror surface 1 to the third mirror surface 3 or vice versa. The plane mirror holder 7 comprises a further plane mirror carrier 8' with a further plane mirror surface 9', which is not active in the representation in FIG. 2*a* and is attached to the lower part of the plane mirror holder 7. The plane mirror holder 7 comprises two outer surfaces 10, 10'. The plane mirror holder 7 rests on the base support 6 with one of the two outer surfaces—here outer surface 10. If the mirror holder 7 is now removed and rotated, with the result that it rests on the base support 6 with the further outer surface 10', the further plane mirror 8' with the further plane mirror surface 9' is located in the beam path. The further third mirror surface 3' is thereby activated and the ratio of input-side beam diameter to output-side beam diameter is changed compared with the previous combination. This is achieved in that the plane mirrors 8, 8'—more precisely the plane mirror surfaces 9, 9'—are arranged at different distances from the centre of the vertical connection between the two outer surfaces 10, 10': the further plane mirror surface 9' is located closer to this centre, with the result that a mirror surface lying further in, here the further third mirror surface 3', is activated.

In the case of a neat design of the outer surfaces 10, 10' and the corresponding counterface on the base support 6 it is in principle sufficient to mount the plane mirror holder 7 on the base support 6. While this may be enough for a laboratory setup, in practical use it proves advantageous if the plane mirror holder 7 can be connected to the base support via coupling elements in a non-positive-locking and/or a positive-locking manner. For this purpose, a first coupling element 11, 11' is formed on the plane mirror holder 7 and a second coupling element 12 is formed on the base support 6. The first coupling element 11, 11' is formed on each of the two outer surfaces 10, 10' in order to allow a stable connection depending on the mirror surface 9, 9' used. Here, the first coupling element 11, 11' is formed by way of example in the manner of a stud, the second coupling element 12 is formed as a groove. The dimensions of the stud and the groove are chosen such that the stud fits precisely in the groove. In order to improve the non-positive connection, the first coupling element 11, 11' and the second coupling element 12 can also be provided with a slight interference fit. Other types of connection, such as for example a screw connection, are also conceivable; the latter is in particular to be preferred when the reflective beam former is used not in the upright position shown here but in a lying or hanging arrangement.

The mirror holder 7 shown in FIG. 2a is merely an embodiment example of such a mirror holder. Mirror holders are also conceivable which contain only one plane mirror 8 with one plane mirror surface 9, or in which the coupling means are realized in another way known in the state of the art. As a rule, if the plane mirrors 8, 8' are attached fixed to the plane mirror holder 7, several plane mirror holders 7 are required if the number of third mirror surfaces 3, 3' is more than two. Alternatively, the plane mirrors 8 can also be affixed in the plane mirror holder 7 to be height adjustable, for example with screw connections. The respective positions at which the plane mirror 8 needs to be affixed in terms of height in order to direct the beam from or to one of the third mirror surfaces 3, 3' can be realized for example with the help of stops and/or locking positions—in this case, the plane mirror 8 is preferably equipped with springs which allow a corresponding engagement.

Figure 3:
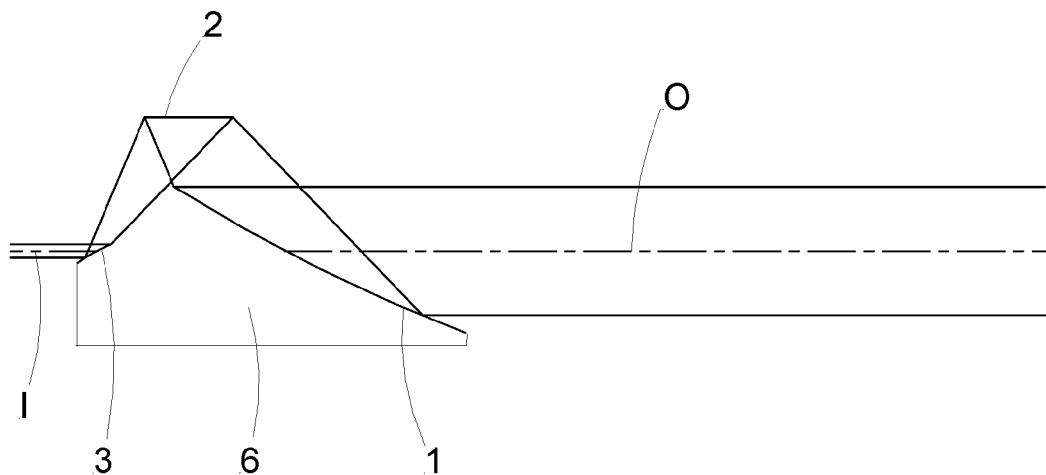
FIG. 3 depicting the basic structure of a further reflective beam former.

Another type of beam guidance for a reflective beam former is outlined in FIG. 3. Here, a so-called on-axis configuration is represented in which an optical axis I of an incident light beam and an optical axis O of the emerging light beam lie on a common straight line, while in FIG. 1 although the optical axis I of the incident light beam, the optical axis O of the emerging light beam and the plane mirror axis, i.e., the normal of the plane mirror surface, are arranged parallel to each other, they are not on one axis. In the case of the embodiment shown in FIG. 3, the plane mirror axis is perpendicular to the optical axes I and O. The configuration in FIG. 3 is only represented for one third mirror surface 3; if several third mirror surfaces are used, the optical axes I, I', . . . are offset in parallel with respect to the optical axis O of the exiting light beam, as is also the case in FIG. 1 when tilted mirrors 4 and 5 are used. Without limiting the generality it was assumed that the beam diameter is to be enlarged; of course it is also possible to use the beam with a larger diameter as input beam and to reduce the diameter.

Here, the first mirror surface 1 and the third mirror surface 3 are formed with a parabolic cross section—not as paraboloids—the beam diameter is therefore only changed in one spatial direction, with the result that the output beam has an elliptical cross section in the case of an input beam with a Gaussian intensity profile and a round cross section. In the example shown in FIG. 3, an expansion only takes place in the drawing plane. In order to make the beam circular again, the same mirror system can be used again sequentially downstream and rotated preferably by 90°.

In manufacturing terms, however, mirror surfaces which correspond to cylindrical mirrors with a parabolic cross section are usually easier to produce than sectional surfaces of paraboloids, with the result that a sequential arrangement of several beam formers behind each other, which are arranged rotated about an angle with respect to each other, is a preferred variant. This also makes it possible in addition to further modify the cross-sectional shape of the emerging beam if angles of less than 90° are also permitted for the tilting. If several beam formers each with several third mirror surfaces 3, 3' are arranged behind each other it is necessary, for a complete utilization of the setting possibilities, to provide means for displacing the beam formers relative to each other, with the result that for an output beam of one of the beam formers correspondingly one of the third mirror surfaces of the downstream beam former is selected for the entering beam, which corresponds to the output beam of the upstream beam former. Instead of a displacement of the individual beam-forming elements with respect to each other, this can also be achieved by means of deflecting elements, for example in the form of partially displaceable mirrors.

Figure 4:
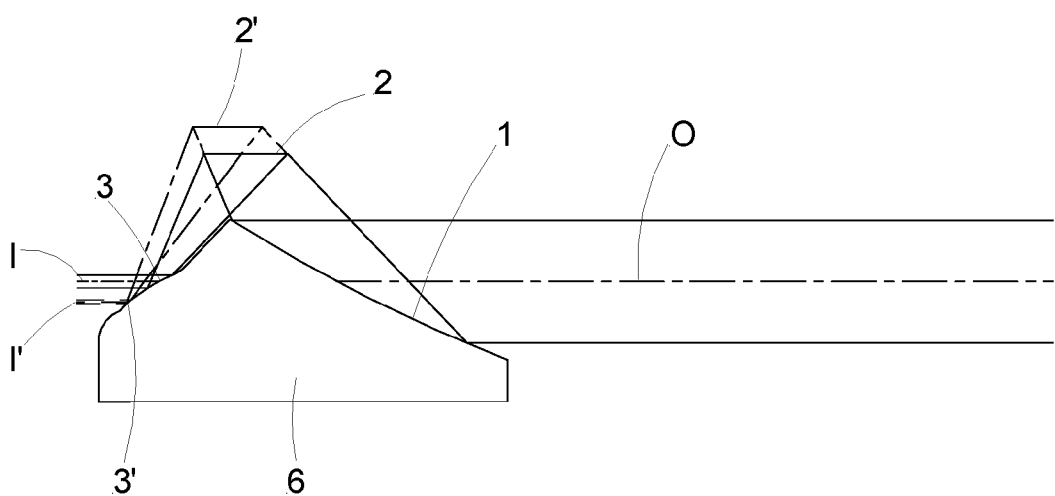
FIG. 4 depicting the structure of such a beam former for several enlargements.

In FIG. 4, an extension of the configuration shown in FIG. 3 to several third mirror surfaces 3, 3' is represented analogously to the configuration already explained in FIG. 1; here the third mirror surfaces 3, 3' and the first mirror surface 1 are again formed on a common base support 6. In principle, this arrangement can also be used with the plane mirror holder 7 already described in connection with FIG. 2.

Figure 5:
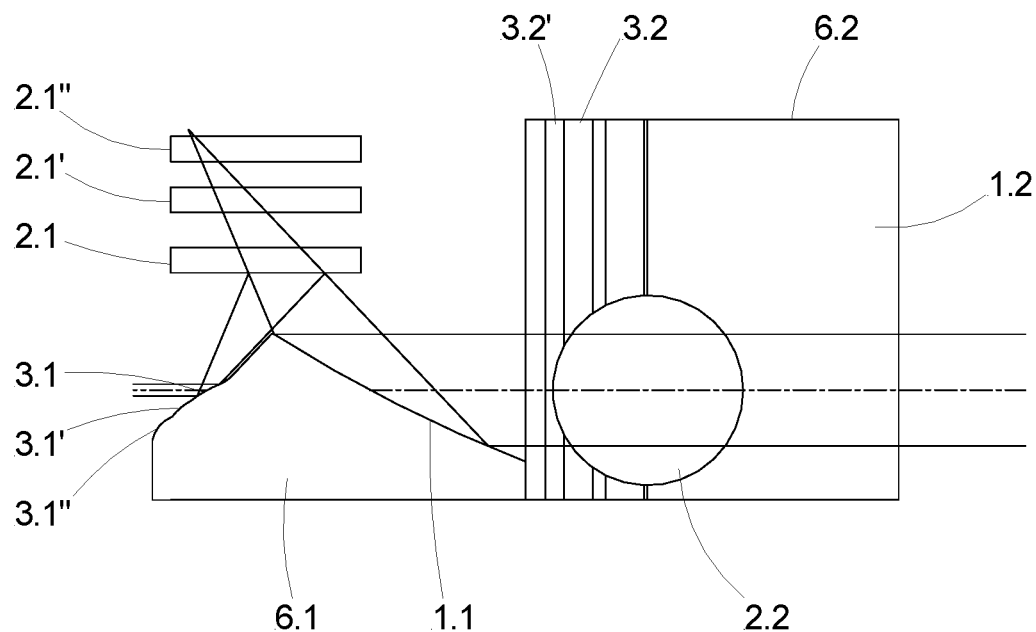
FIG. 5 depicting a sequence of several beam formers.

FIG. 5 shows the use of two beam formers arranged behind each other from FIG. 4 which are arranged rotated with respect to each other at an angle of 90°. The first mirror surface 1.1 and the third mirror surfaces 3.1, 3.1' of the first, front beam former are arranged on a base support 6.1, and the first mirror surface 1.2 and the third mirror surfaces 3.2, 3.2' of the second, rear beam former are attached to a base support 6.2. For the selection of the respective third mirror surface 3.1, 3.1', the beam former comprises either several second mirror surfaces 2.1, 2.1', 2.1", or a plane mirror which can be displaced into the respective positions. The same applies to the second mirror surface 2.2 of the second beam former. In the case of a correspondingly larger distance of the first mirror surfaces 1.1 and the third mirror surfaces 3.1, 3.1' in—relative to the sheet plane—the horizontal direction, i.e., parallel to the axis of the incident and emerging beam, plane mirror holders as were already described in connection with FIG. 2 can also be used.

Figure 6:
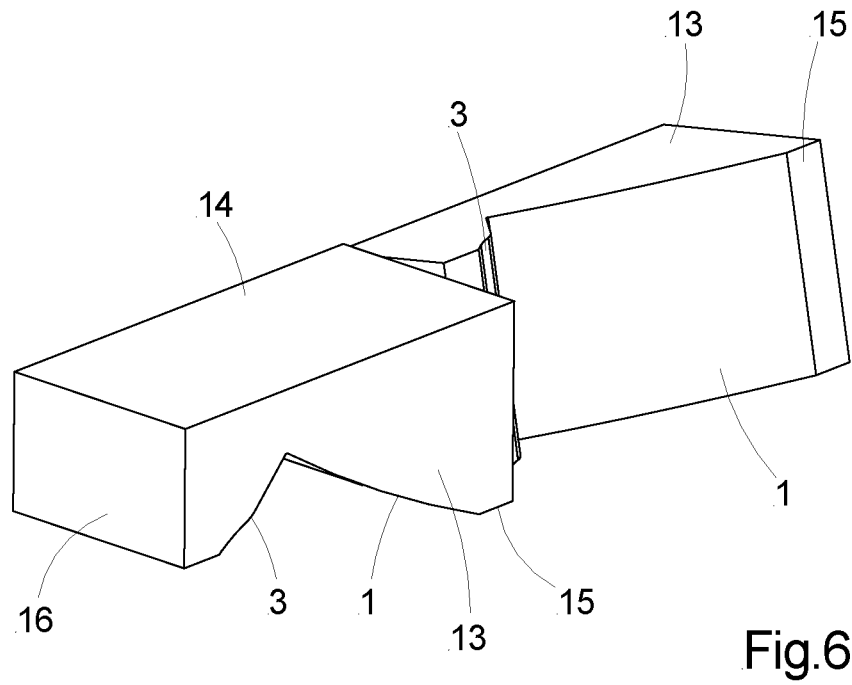
FIG. 6 depicting a sequence of several beam formers in perspective view.

A particularly advantageous embodiment of a reflective beam former is represented in FIG. 6. This beam former comprises a base support 13 which is formed as a monolithic element; the monolithic element is made of a material with a higher refractive index than air—for example glass—and is transparent to the light of the light beam, the beam diameter of which is to be changed. At least one plane mirror surface 14, which is located at a predetermined distance from a base plane, is formed on the base support 13. Here, the base plane is symbolized by a base 15 which is located in the base plane. However, the base plane can also correspond to a plane mirror surface, and then the distance would be zero.

The incident beam enters the base support 13, for example, at a front surface 16 and is reflected internally. With appropriate choice of glass and a suitable angle of reflection, the principle of total reflection can be utilized for this. In this way, a particularly simple component which is cost-effective to produce, compact and robust results which forms the beam former. On surfaces on which no total reflection is possible because of the angle of incidence, a reflective layer is applied in each case to the outsides of the monolithic base support 13. Of course, this can also be applied in addition in order to suppress undesired reflections. In the arrangement represented in FIG. 6, two such prism-like beam formers are arranged in series behind each other, wherein the rear beam former is rotated by an angle which is not 90° with respect to the front beam former about a common axis, which can correspond to the optical axis, in order to compensate for input beam errors, such as for example a rotation error whereby the input beam does not have complete rotational symmetry.

Figure 7:
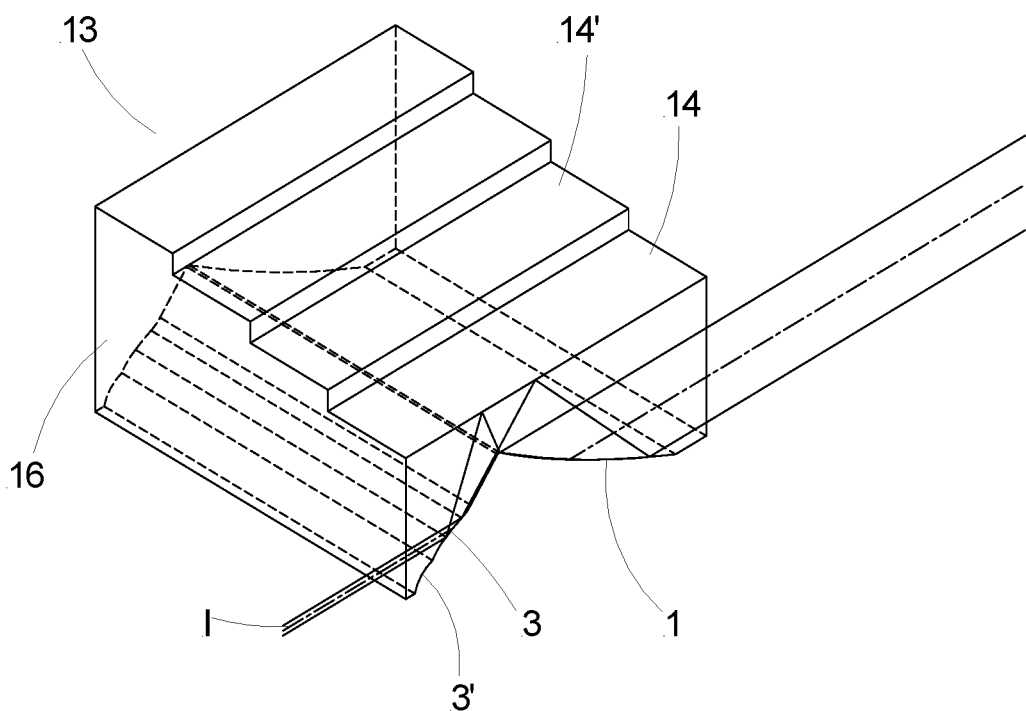
FIG. 7 depicting a further embodiment of a reflective beam former.

FIG. 7 shows such a prism-like reflective beam former, as was described in FIG. 6, which, in contrast to the beam former from FIG. 6 designed for a single enlargement or reduction, permits several enlargements or reductions. For this, several plane mirror surfaces 14, 14', . . . which are parallel to each other at different distances from the base plane—here again the base 15—are formed on the base support 13, and each of the different plane mirror surfaces 14, 14', . . .

is assigned to a different third mirror surface 3, 3', . . . . The selection of the respective enlargement is then carried out by means of the relative displacement of the reflective beam former or of the base support 13 perpendicular to the optical axis I of the incident light beam and namely in two directions spanning one plane. By means of a relative displacement of the base support 13 in terms of height, another of the third mirror surfaces 3, 3', . . . is selected, and by means of a displacement perpendicular thereto, therefore here transverse to the optical axis, a selection of the corresponding plane mirror surfaces 14, 14', . . . which is assigned to the respective third mirror surface 3, 3', . . . is carried out. Either the beam former itself can be displaced or the input beam or both.

Figure 8:
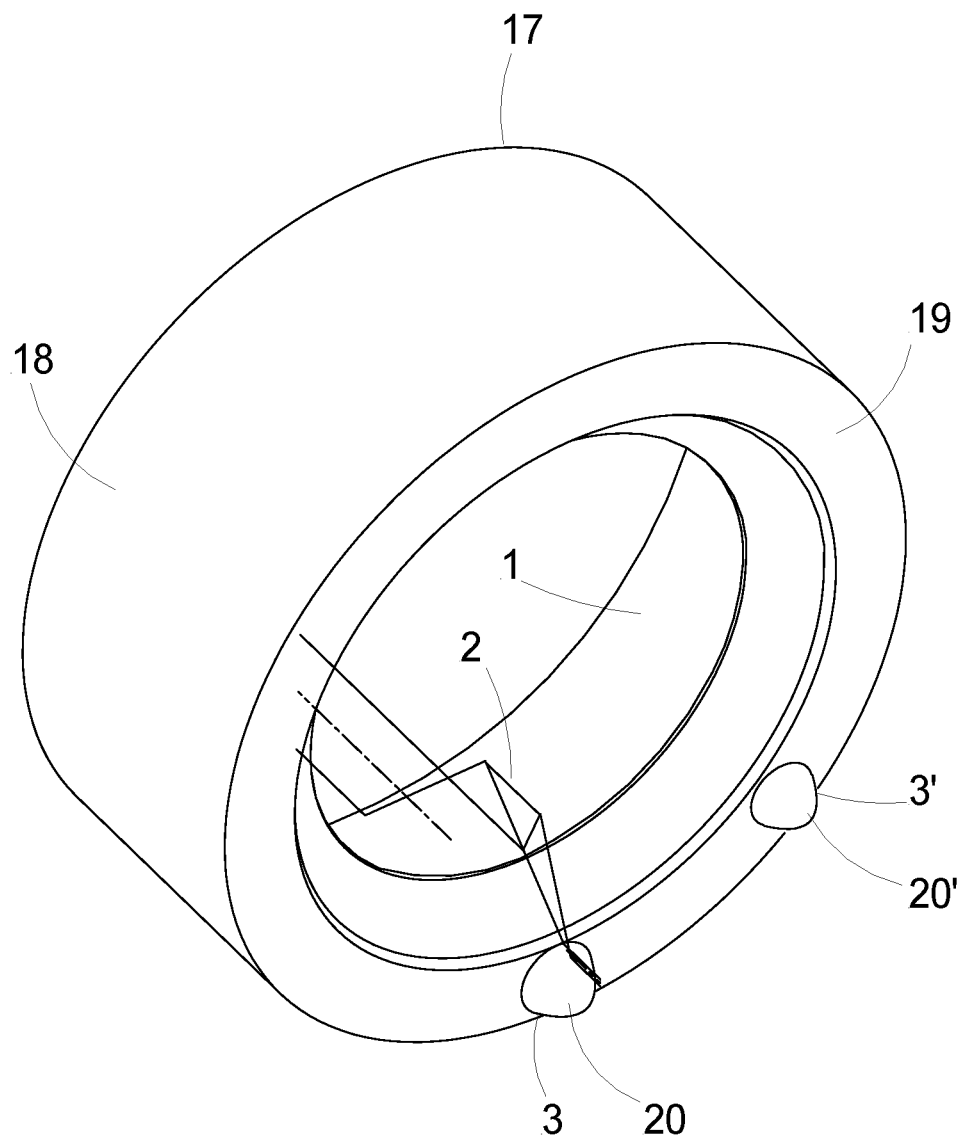
FIG. 8 depicting an embodiment of a beam former with parabolic surfaces.

A further variant of a reflective beam former, in which the first curved mirror surface 1 and the third mirror surfaces 3, 3' are formed parabolic, i.e., convert a rotationally symmetrical beam back into a rotationally symmetrical beam with a changed diameter, is represented in FIG. 8. A base support 17 which comprises a cross section similar to the base body 6 shown in FIG. 3, in particular as relates to the position of the first mirror surface 1, forms the base. The base support 17 is annular and has the shape of a cylinder segment with an outer surface shell 18. The first mirror surface 1 is formed on the inner circumference of the base support 17. On an annular surface 19, which connects to the surface shell 18 and is formed on the side of the base support 17 facing away from the first mirror surface 1, different elevations 20, 20' are formed or attached, distributed around the circumference, which elevations have a parabolic shape and on which the third mirror surfaces 3, 3' are formed. The at least one mirror surface 2 is represented here only symbolically. By rotating the base body 17 about the axis of rotation of the cylinder relative to the surface shell 18, different elevations 20, 20', i.e., different third mirror surfaces, can be selected and thus the enlargement varied. Care must be taken that the position of the second mirror surface 2 is in each case adapted to the selected elevation 20, 20', . . . , which can be carried out either by height adjustment or by introducing another second mirror surface. Of course, the arrangement also functions with only one single third mirror surface; in this case only one second mirror surface is also required, or height adjustment can be dispensed with.

LIST OF REFERENCE NUMBERS

1 first mirror surface
2, 2' second mirror surface
3, 3' third mirror surface
4, 5 tilted mirror
6 base support
7 plane mirror holder
8, 8' plane mirror
9, 9' plane mirror surface
10, 10' outer surface
11, 11' first coupling element
12 second coupling element
13 base support
14, 14' plane mirror surface
15 base
16 front surface
17 base support
18 outer surface shell
19 annular surface
20, 20' elevation
I, O optical axis

The invention claimed is:

1. A reflective beam former for changing the diameter of a collimated light beam, comprising:
   at least one first mirror surface of a first type of curvature,
   at least one second mirror surface designed as a plane mirror surface with a plane mirror axis perpendicular to the second mirror, and
   at least two third curved mirror surfaces of a second type of curvature, which differ in terms of their curvatures, wherein one of the two types of curvature is convex and the other is concave, wherein the shapes of the mirror surfaces are matched to each other, with the result that a collimated light beam entering the beam former via a first mirror surface or a third mirror surface leaves the beam former via a third mirror surface or first mirror surface, respectively, as a collimated light beam,
   wherein the at least one first mirror surface, the at least one second mirror surface and the at least two third curved mirror surfaces are arranged one after the other in a beam path,
   wherein the at least one second mirror surface is arranged in the beam path between the first mirror surface and one selected from the at least two third mirror surfaces in such a way that the first mirror surface and a selected third mirror surface are positioned confocal with respect to each other, and
   the beam former comprises a selector for selection of one of the at least two third curved mirror surfaces by selecting a position for a plane mirror surface in the beam path along the plane mirror axis for variable setting of the ratio of the diameter of entering to emerging collimated light beam.

2. The reflective beam former according to claim 1, wherein the at least two third mirror surfaces are arranged fixed on a common base support at distances from the plane mirror axis which differ from each other and/or the first mirror surface is arranged fixed on the base support.

3. The reflective beam former according to claim 2, wherein the selector comprises:
- a plane mirror carrier which can be displaced along the plane mirror axis and/or can be tilted for the selection of one of the at least two third mirror surfaces, and which carries the plane mirror surface, or
- at least two plane mirror carriers which can be introduced into the beam path along the plane mirror axis at predetermined positions preferably alternatively and which in each case carry one plane mirror surface, or
- at least two plane mirror holders which can be coupled into the beam path alternatively via a coupler, wherein a plane mirror holder holds at least one plane mirror with a plane mirror surface and with each plane mirror a different third mirror surface can be selected without adjustment.

4. The reflective beam former according to claim 1, wherein the selector comprises:
- a plane mirror carrier which can be displaced along the plane mirror axis and/or can be tilted for the selection of one of the at least two third mirror surfaces, and which carries the plane mirror surface, or
- at least two plane mirror carriers which can be introduced into the beam path along the plane mirror axis at predetermined positions preferably alternatively and which in each case carry one plane mirror surface, or
- at least two plane mirror holders which can be coupled into the beam path alternatively via a coupler, wherein a plane mirror holder holds at least one plane mirror with a plane mirror surface and with each plane mirror a different third mirror surface can be selected without adjustment.

5. The reflective beam former according to claim 2, wherein the selector comprises at least two plane mirror holders which can be coupled into the beam path alternatively via a coupler, wherein a plane mirror holder holds at least one plane mirror with a plane mirror surface and with each plane mirror a different third mirror surface can be selected without adjustment, and wherein the coupler comprises a first coupling element which is formed or arranged on the plane mirror holder and a second coupling element which is formed or arranged on the base support and with which the first coupling element can be connected in a non-positive-locking and/or a positive-locking manner.

6. The reflective beam former according to claim 1, wherein to lateral surface portions of a mirror of the first mirror surface having the first type of curvature and of mirrors of the at least two third mirror surfaces having the second type of curvature, aspherical corrections of the respective other type of curvature or free-form corrections are applied.

7. The reflective beam former according to claim 1, wherein an optical axis of the incident light beam, an optical axis of the emerging light beam and the plane mirror axis are arranged parallel to each other.

8. The reflective beam former according to claim 1, wherein the optical axis of the incident light beam and the optical axis of the emerging light beam lie on a common straight line and perpendicular to the plane mirror axis.

9. A set of reflective beam formers comprising first and second reflective beam formers according to claim 1, the second reflective beam former comprising a reflective beam former of the same type as the first reflective beam former, the first and second beam formers arranged sequentially and turned by a predetermined angle with respect to each other for expanding or compressing a collimated light beam.

10. The set of reflective beam formers according to claim 9, wherein the predetermined angle is 90°.

11. The reflective beam former according to claim 1, wherein the at least one first mirror surface and the at least two third curved mirror surfaces are formed as sectional surfaces from paraboloids or from cylindrical mirrors with a parabolic cross section, or as free-form surfaces.

12. A reflective beam former for changing the diameter of a collimated light beam, comprising:
- a base support which is formed as a monolithic element which is made of a material with a higher refractive index than air and is transparent to the light of the light beam,
- at least one first mirror surface of a first type of curvature;
- at least one second mirror surface designed as a plane mirror surface with a plane mirror axis perpendicular to the second mirror at a predetermined distance from a base plane of the base support; and
- at least one third curved mirror surface of a second type of curvature;
- wherein the at least one first mirror surface, the at least one second mirror surface and the at least one third mirror surface are arranged one after the other in a beam path and formed on the base support;
- wherein one of the first and second types of curvature is convex, and the other of the first and second types of curvature is concave, wherein shapes of the mirror surfaces are matched to each other, with a result that a collimated light beam entering the beam former via a first mirror surface or a third mirror surface leaves the beam former via a third mirror surface or a first mirror surface, respectively, as a collimated light beam; and
- wherein the at least one second mirror surface is arranged in the beam path between the at least one first mirror surface and the at least one third mirror surface in such a way that the at least first mirror surface and the at least third mirror surface are positioned confocal with respect to each other.

13. The reflective beam former according to claim 12, comprising
- at least two third mirror surfaces which differ in terms of their curvatures,
- at least two plane mirror surfaces formed on the base support which are parallel to each other at different distances from a base plane, of which each one is assigned to a different third mirror surface,
- wherein the base support is relatively displaceable perpendicularly with respect to the optical axis of an incident beam for selecting one of the at least two plane mirror surfaces and therefore of one of the at least two third mirror surfaces.

14. The reflective beam former according to claim 12, wherein the first curved mirror surface and the at least one third curved mirror surface are formed as sectional surfaces from paraboloids or from cylindrical mirrors with a parabolic cross section, or as free-form surfaces.

15. The reflective beam former according to claim 12, wherein to lateral surface portions of a mirror of the first mirror surface having the first type of curvature and of mirrors of the at least two third mirror surfaces having the second type of curvature, aspherical corrections of the respective other type of curvature or free-form corrections are applied.

16. The reflective beam former according to claim 12, wherein an optical axis of the incident light beam, an optical axis of the emerging light beam and the plane mirror axis are arranged parallel to each other.

17. The reflective beam former according to claim 12, wherein an optical axis of the incident light beam and an optical axis of the emerging light beam lie on a common straight line and perpendicular to the plane mirror axis.

18. The reflective beam former according to claim 12, further comprising, formed on the base support, a first boundary surface perpendicular to the beam direction and arranged in the beam path in front of the at least one first mirror surface where the light beam enters the base support, and a second boundary surface perpendicular to the beam direction and arranged in the beam path behind the at least one third mirror surface where the light beam emerges on axis from the base support.

19. The reflective beam former according to claim 12, comprising at least one further reflective beam former of the same type, the at least two beam formers arranged sequentially and turned by a predetermined angle with respect to each other for expanding or compressing a collimated light beam.

\* \* \* \* \*